United States Patent [19]

Skokan et al.

[11] Patent Number: 5,237,695
[45] Date of Patent: Aug. 17, 1993

[54] BUS CONTENTION RESOLUTION METHOD FOR NETWORK DEVICES ON A COMPUTER NETWORK HAVING NETWORK SEGMENTS CONNECTED BY AN INTERCONNECTION MEDIUM OVER AN EXTENDED DISTANCE

[75] Inventors: Zdenek E. Skokan, Redwood City; W. Gordon Matheson, Penryn, both of Calif.

[73] Assignee: Hewlett-Packard Company, Palo Alto, Calif.

[21] Appl. No.: 786,667

[22] Filed: Nov. 1, 1991

[51] Int. Cl.⁵ .......................................... G06F 13/36
[52] U.S. Cl. ................... 395/725; 395/325; 340/825.5; 370/85.6; 364/242.94; 364/242.6; 364/DIG. 1
[58] Field of Search ............... 395/325, 725, 200, 425, 395/275, 800; 370/85.2, 85.1, 85.14, 85.13, 85.6, 93; 340/825.5, 825.51; 371/11.3; 365/230.01

[56] References Cited

U.S. PATENT DOCUMENTS

| | | | |
|---|---|---|---|
| 4,620,278 | 10/1986 | Ellsworth et al. | 364/200 |
| 4,779,089 | 10/1988 | Theus | 340/825.5 |
| 4,837,682 | 6/1989 | Culler | 364/200 |
| 4,897,784 | 1/1990 | Nay | 364/200 |
| 4,941,086 | 1/1990 | Kriz | 364/200 |
| 4,972,313 | 11/1990 | Getson, Jr. et al. | 364/200 |
| 4,982,321 | 1/1991 | Pantry et al. | 364/200 |
| 5,006,981 | 4/1991 | Beltz et al. | 364/200 |
| 5,081,576 | 1/1992 | Ward | 395/325 |
| 5,101,482 | 3/1992 | Kipnis | 395/325 |
| 5,129,090 | 7/1992 | Bland et al. | 395/725 |

Primary Examiner—Michael R. Fleming
Assistant Examiner—Gopal C. Ray

[57] ABSTRACT

A method is used to perform arbitration between network devices connected to one of a first network segment and a second network segment, where the first network segment is connected to the second network segment by a long interconnection medium over an extended distance. When one or more network devices connected to the first network segment senses the network is free and desires control of the network for a data transfer, each of these network devices will assert a first network control signal. When the first network control signal is first asserted, this marks the beginning of an arbitration period for the first network segment. The first network control signal is forwarded to the second network segment. Upon the second network segment receiving the first network control signal, any arbitration currently in progress upon the second network segment is aborted. Upon completion of the arbitration period and provided arbitration on the first network segment has not been aborted, one of the network devices connected to the first network segment is granted control of the network.

16 Claims, 9 Drawing Sheets

BUS CONTENTION RESOLUTION METHOD FOR NETWORK DEVICES ON A COMPUTER NETWORK HAVING NETWORK SEGMENTS CONNECTED BY AN INTERCONNECTION MEDIUM OVER AN EXTENDED DISTANCE

BACKGROUND

The present invention concerns a method which allows for bus contention resolution over extended distances without increasing a standard protocol time-constant used during arbitration.

In one category of network architectures, network devices are connected to a common communication bus. When one of the network devices desires to initiate a transfer of data over the bus, the network device will attempt to gain control of the bus. Once the network device has control of the bus, the transfer of data may be performed.

In general, only one network device may have control of the bus at any one time. When two or more network devices simultaneously desire to gain control of the communication bus, some type of contention resolution scheme is required to assure that only one network device will gain control of the communication. Contention resolution may be done in a number of ways. For example, once the communication bus is free, control of the communication bus may be granted to the first network device that requests bus control. Alternately, control of the communication may be granted to the network device which has a highest priority among network devices which have requested bus access during a particular period of time. The relative priority of the network devices may be permanently assigned or may be variable based on one or more parameters.

For example, the Small Computer Standard Interface (SCSI) is an input/output (I/O) interface connection used for personal computers. SCSI was originated as a disk memory interface and became a universal high speed I/O protocol. In communication bus systems which operate in accordance with the SCSI protocol, SCSI devices connected to a communication bus have a fixed network access priority. In the SCSI bus protocol, contention resolution is accomplished by granting bus control to the SCSI device which has the highest networ access priority among the SCSI devices which, during an arbitration time period, request control of the communication bus.

More specifically, according to the SCSI protocol, after a specific period in which the communication bus is free, each SCSI device desiring control of the bus asserts its ID code on one of eight wire-or'ed data bus lines and asserts the BSY control signal. The SCSI bus protocol uses negative true, therefore, when discussing the SCSI bus protocol herein, what is meant by assertion is placing a logic 0 on a line (In protocols with a positive true, assertion generally means placing a logic 1 on a line). The network access priority for each SCSI device is determined by its ID code. The SCSI devices wait for an arbitration period of 2.4 microseconds. The arbitration period begins upon the first assertion of the BSY control signal by one of the SCSI devices. After the arbitration period, the SCSI devices evaluate the signals on the data bus lines. The SCSI device with the highest ID is granted control of the communication bus. The SCSI device having gained control of the bus asserts the SEL control signal. The other SCSI devices must release the BSY signal and wait for the communication bus to be free before they can try again.

Hardware implementation of a communication bus which uses the SCSI protocol is generally done using a 50 conductor flat ribbon or round bundle cable of characteristic impedance of 100 ohm. The nominal distance is six meters in single ended mode and 25 meters in differential mode. For more information on the SCSI protocol, see the American National Standard for SCSI-2, available as Document X3.131-199X from Global Engineering Documents, 2805 McGaw, Irvine, Calif. 92714. For the purposes herein, a SCSI bus is a bus system which conforms with the SCSI-2 protocol defined by this standard.

When attempting to utilize protocols such as the SCSI-2 protocol over an extended distance, transmission delay of signals between bus segments can cause malfunctioning of the contention resolution. For example, in a SCSI system with an arbitration time period of 2.4 microseconds, when transmission delay between bus segments is greater than 1.2 microseconds, a first SCSI device with a low priority access ID may not detect the assertion of a higher priority access ID by a second SCSI device with a higher priority access ID processor during the arbitration period. Concurrently, the second SCSI device may not make a timely detection of the assertion of the SEL control line by the first network. Consequently, both the first SCSI device and the second SCSI device may concurrently assert control over the communication bus.

SUMMARY OF THE INVENTION

In accordance with the preferred embodiment of the present invention, a method is provided for performing arbitration between network devices connected to one of a first network segment and a second network segment, where the first network segment is connected to the second network segment by a long interconnection medium over an extended distance.

In the method, when one or more network devices connected to the first network segment senses the network is free and desires control of the network for a data transfer, each of these network devices will assert a first network control signal. The first network control signal, for example, corresponds to the SCSI BSY signal. When the first network control signal is first asserted, this marks the beginning of an arbitration period for the first network segment.

The first network control signal is forwarded to the second network segment. Upon the second network segment receiving the first network control signal, any arbitration currently in progress upon the second network segment is aborted. Upon completion of the arbitration period and provided arbitration on the first network segment has not been aborted, one of the network devices connected to the first network segment is granted control of the network.

In a first embodiment of the invention, the first network segment and the second network segment have equal priority. In this embodiment, therefore, when one or more network devices connected to the second network segment senses the network is free and desires control of the network for a data transfer, each of these network devices will assert the first network control signal. When the first network control signal is first asserted, this marks the beginning of an arbitration period for the second network segment.

The first network control signal is forwarded to the first network segment. Upon the first network segment receiving the first network control signal and provided arbitration on the first network segment has not been aborted, any arbitration currently in progress upon the first network segment is aborted. Upon completion of the arbitration period and provided arbitration on the second network segment has not been aborted, one of the network devices on the second network connected to the first network segment is granted control of the network.

In the first embodiment, when arbitration is aborted on both the first network segment and the second network segment, after a waiting period, the network devices reassert the first network control signal starting a new arbitration period on each network segment.

In the second embodiment of the present invention, the first network segment is given priority over the second network segment. In this embodiment, when one or more network devices connected to the second network segment senses the network is free and desires control of the network for a data transfer, each of these network devices assert the network control signal.

When the first network control signal is initially asserted on the second network segment, arbitration on the second network segment is aborted. A request is made and control of the first network segment is obtained. This will prevent any network device connected to the first network segment from gaining control of the network. Once control of the first network segment has been obtained, the first network control signal may be reasserted by one or more network devices connected to the second network segment. After arbitration, one of the network devices connected to the second network segment gains control of the network.

In both the first embodiment and the second embodiment of the present invention, arbitration on a bus segment may be aborted, for example, by asserting on a network segment a second network control signal which indicates a network device has won arbitration. For example, the second network control signal corresponds to the SCSI SEL signal. In addition, a highest priority network device identification may be asserted. For example, the highest priority network device identification corresponds to the SCSI ID7 signal.

Similarly, in the second embodiment of the present invention, when control of the first network segment is obtained at the request of the second network segment, the control may be gained by asserting on the first network segment the second network control signal. In addition, a highest priority network device identification may be asserted on the first network segment.

DESCRIPTION OF THE PREFERRED EMBODIMENT

Figure 1:
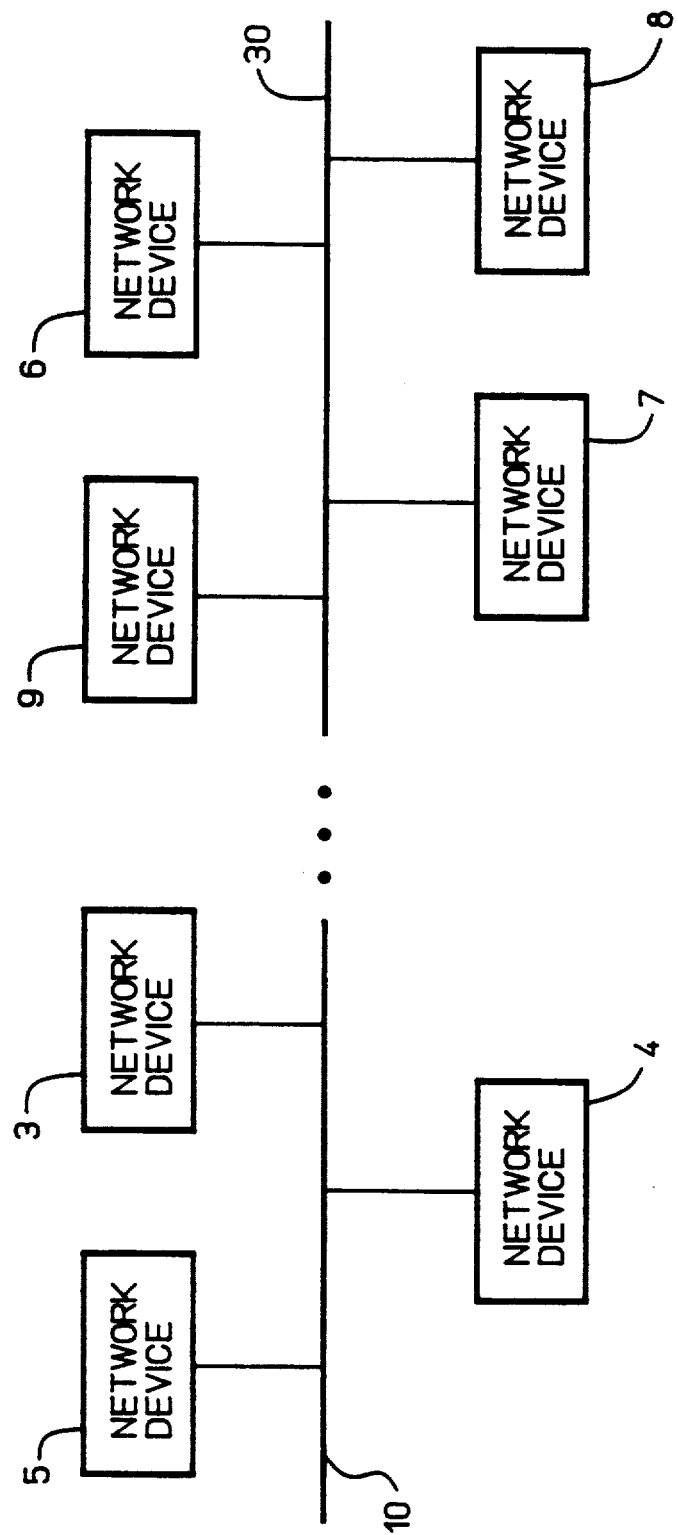
FIG. 1 is a functional block diagram of two ends of a network separated an extended distance in accordance with the preferred embodiment of the present invention.

FIG. 1 is a conceptual block diagram which shows a SCSI device 3, a SCSI device 4 and a SCSI device 5 connected to a SCSI bus segment 10 and shows a SCSI device 6, a SCSI device 7, a SCSI device 8 and a SCSI device 9 connected to a SCSI bus segment 30. SCSI bus segment 10 and SCSI bus segment 30 are separated by an extended distance which is greater than the nominal distance for a SCSI bus.

Figure 2:
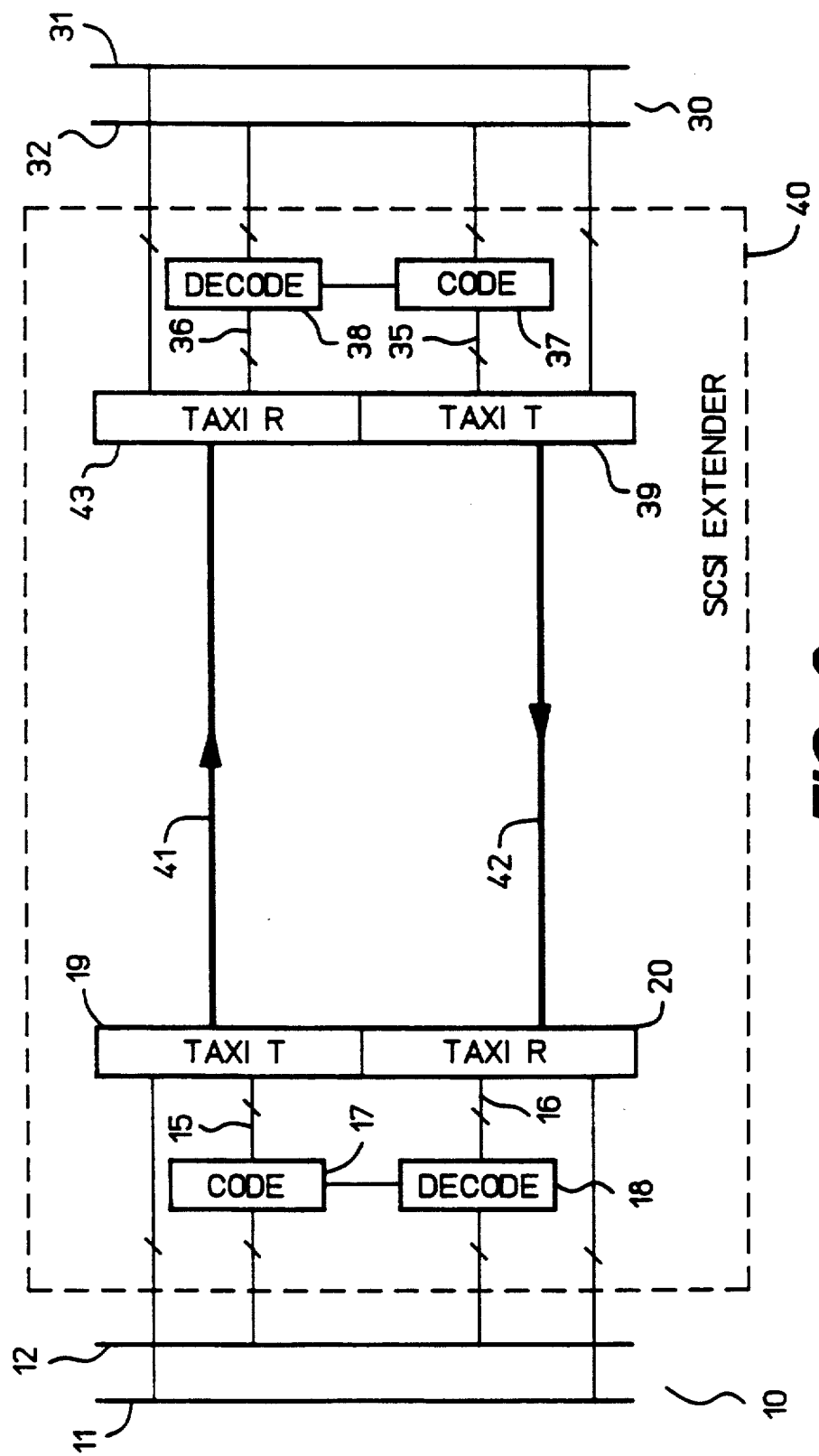
FIG. 2 shows a block diagram of a network architecture which provides for connection of two segments of a bus by a long interconnection medium in accordance with a preferred embodiment of the present invention.

FIG. 2 shows a block diagram of a SCSI extender 40 which connects SCSI bus segment 10 to SCSI bus segment 30 over the extended distance. SCSI bus segment 10 has nine control lines 12 and nine data lines 11. SCSI bus segment 30 also has nine control lines 32 and nine data lines 31. The nine data lines include eight lines on which are placed data signals and an additional line for parity checking. SCSI devices connected to either SCSI bus segment 10 or SCSI bus segment 30 are connected by "Wired-Or" connections. That is, the control lines and data lines are connected to the SCSI devices so that each control line or data line is asserted when any SCSI device asserts that control line or data line. A control line or data line remains unasserted only when no SCSI device asserts that control line or data line.

SCSI extender 40 operates by sampling values on data lines 11 and control lines 12 of SCSI bus segment 10 and updates values on data lines 31 and control lines 32 of SCSI bus segment 30 with the sampled values from SCSI bus segment 10. Similarly, SCSI extender 40 samples values on data lines 31 and control lines 32 of SCSI bus segment 30 and updates values on data lines 11 and control lines 12 of SCSI bus segment 10 with the values from SCSI bus segment 30.

Sampling of values on SCSI bus segment 10 is done by a transmitter TAXI unit 19. Sampled values are transmitted through a long interconnection medium 41 to a receiver TAXI unit 43. In order to maximize available bandwidth when transmitting across long interconnection medium 41, values on control lines 12 are encoded through a code unit 17. For example, code unit 17 codes the nine control lines 12 into three coded control lines 15. Additionally, a strobe line, not shown, extends from code unit 17 to transmit TAXI unit 19. The values on coded control lines 15 plus input from decoder unit 18 directs transmit TAXI unit 19 to transmit one of eight control codes or data from data lines 11 through long interconnection medium 41 to receiver TAXI unit 43. When a control code is transmitted, receiver TAXI unit 43 places the transmitted values on three coded control lines 36. A decoder 38 decodes the values on control lines 36 to update values on control lines 32 of SCSI bus segment 30. Data received by receiver TAXI unit 43 is placed on data lines 31.

Similarly, sampling of values on SCSI bus segment 30 is done by a transmitter TAXI unit 39. Sampled values are transmitted through a long interconnection medium 42 to a receiver TAXI unit 20. In order to maximize available bandwidth when transmitting across long interconnection medium 42, values on control lines 32 are encoded through a code unit 37. For example, code unit 37 codes the nine control lines 32 into three coded control lines 35. Additionally, a strobe line, not shown, extends from code unit 37 to TAXI unit 39. The values on coded control lines 35 plus input from decoder unit 38 directs transmit TAXI unit 39 to transmit one of eight control codes or data from data lines 31 through long interconnection medium 42 to receiver TAXI unit 20. A decoder 18 decodes the values on control lines 16 to update values on control lines 12 of SCSI bus segment 10. Data received by receiver TAXI unit 20 is placed on data lines 11.

Bus extenders which sample values on one segment of a bus and transmit the values to another segment of the bus through a long interconnection medium are generally known in the art. See for example, the HP IB extender Model Number HP 37203A, available from Hewlett Packard Co. having a business address of 3000 Hanover Street, Palo Alto, Calif. 94304, or see the Paraline-SF40 bus extender available from Paralan Corp., having a business address of 7171 Ronson Road, San Diego Calif. 92111. See also model AM 7968/7969 available from Advanced Micro Devices, Inc. having a business address of 901 Thompson Place, Sunnyvale, Calif. 94086.

Using fiber optic or coax cables for interconnection medium 41 and interconnection medium 42 and using a sampling rate of approximately 10.5 Megahertz, extender 40 can be used to connect two segments of a SCSI bus separated by 100 meters. The SCSI-2 protocol will tolerate delays introduced by extender 40 with only a single exception. The transmission delay through extender 40 can have a deleterious effect on the contention resolution scheme.

Figure 3:
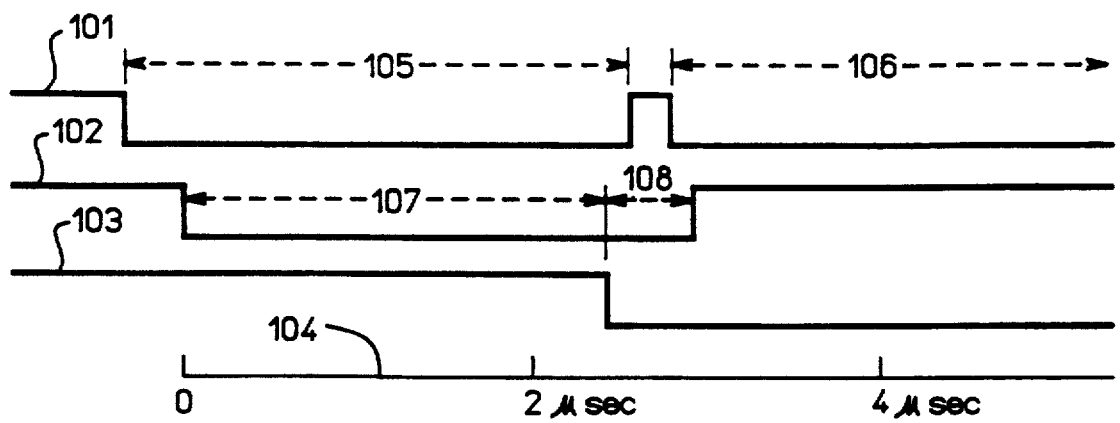
FIG. 3 shows a timing diagram for arbitration control signals for a SCSI network in the prior art.

FIG. 3 shows a timing diagram of the contention resolution scheme for a SCSI bus system. A plot 101 represents timing for the SCSI ID placed on the data lines. A plot 102 represents timing for the SCSI BSY signal. A plot 103 represents timing for the SCSI SEL signal.

For each SCSI device which wishes to initiate a data transmission on the SCSI bus, once such a SCSI device detects that the SCSI bus is free, the SCSI device places its ID on the data lines. This is represented by the falling edge of plot 101. The ID remains on the data lines during a period 105. Once a SCSI device has placed its ID on the data lines, the SCSI device asserts the SCSI BSY signal as represented by the falling edge of plot 102.

The first SCSI device to assert the SCSI BSY signal starts an arbitration time period 107. The beginning of arbitration time period 107 is the "0" point on a time line 104 and the end of arbitration time period occurs 2.4 microseconds later, as shown. At the end of arbitration time period 107, each of the SCSI devices examines the IDs on the data lines. The SCSI device with the highest ID wins the arbitration. That SCSI device will assert the SEL signal, as represented by the falling edge of plot 103. At the end of a period 108 from the time that the SEL signal is asserted, each SCSI device releases the BSY signal. Also, during a period 106, the SCSI device that won the arbitration places the ID of another SCSI device on the data lines and the communication between SCSI devices proceeds.

As discussed above, for a SCSI bus having segments separated by an extended distance, the arbitration process can fail when the transmission delay between segments is greater than half the arbitration period. In such a case, the transmission delay can result in two SCSI devices in different segments of the SCSI bus "winning" arbitration.

Figure 4:
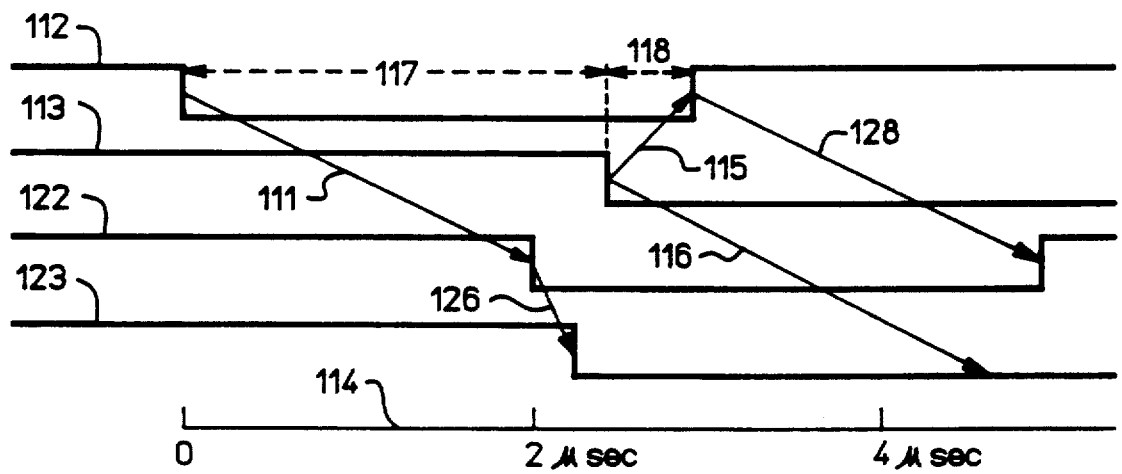
FIGS. 4 and 5 show timing diagrams which illustrate arbitration control signals for a SCSI network in which two bus segments are connected by a long interconnection medium in accordance with a preferred embodiment of the present invention.
Figure 5:
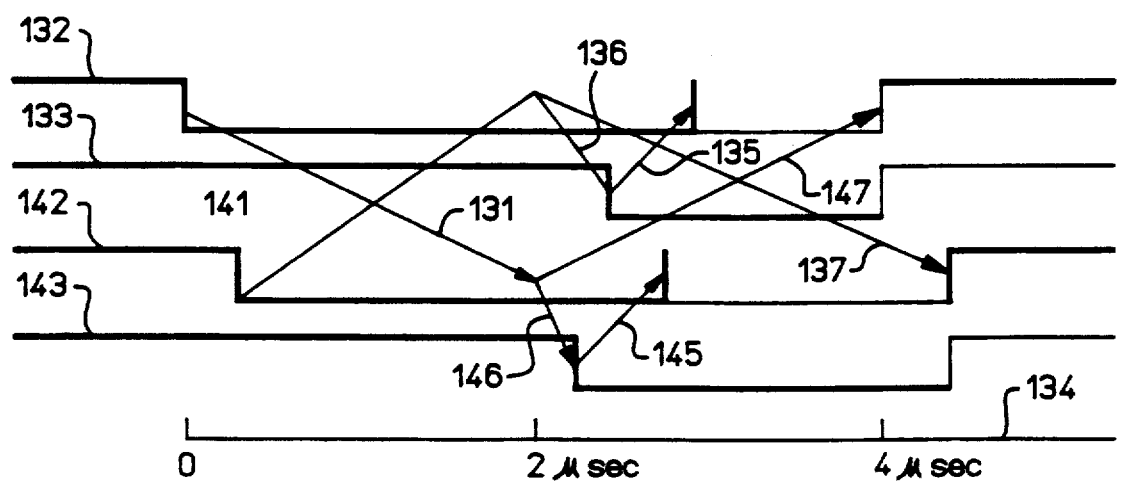

FIGS. 4 and 5 show timing diagrams for a method in accordance with a preferred embodiment of the present invention which allows successful arbitration when the transmission delay between segments of a SCSI bus is less than the arbitration period. This embodiment of the invention takes advantage of the requirement that once a SCSI device determines the SCSI SEL signal is asserted, the SCSI device ceases contention for the bus. For example, in the following example, the transmission delay between SCSI bus segment 10 and SCSI bus segment 30, as shown in FIG. 2, is two microseconds.

FIG. 4 represents timing diagrams for the case where one or more SCSI devices on SCSI bus segment 10 asserts the SCSI BSY signal, and no SCSI device on SCSI bus segment 30 asserts the SCSI BSY signal. In FIG. 4, a plot 112 represents timing for the SCSI BSY signal on control lines 12. A plot 113 represents timing for the SCSI SEL signal on control lines 12. A plot 122 represents timing for the SCSI BSY signal on control lines 32. A plot 123 represents timing for the SCSI SEL signal on control lines 32.

When a SCSI device on SCSI bus segment 10 asserts the SCSI BSY signal, as represented by the falling edge of plot 112, an arbitration period 117 begins. The beginning of arbitration time period 117 is the "0" point on a time line 114 and the end of arbitration time period occurs 2.4 microseconds later, as shown. The assertion of the SCSI BSY signal takes two microseconds to propagate through to SCSI bus segment 30, as represented by the falling edge of plot 122. An arrow 111 represents the causal connection between the assertion of the SCSI BSY signal on SCSI bus segment 10, represented by the falling edge of plot 112, and the assertion of the SCSI BSY signal on bus segment 30, represented by the falling edge of plot 122.

In a significant variation from the SCSI protocol, once extender 40 asserts the SCSI BSY signal on SCSI bus segment 30, represented by the falling edge of plot 122, extender 40 also asserts the SCSI SEL signal on bus segment 30, as represented by the falling edge of plot 123. The causal connection between the assertion of the SCSI BSY signal on SCSI bus segment 30, represented by the falling edge of plot 122, and the assertion of the SCSI SEL signal on bus segment 30, represented by the falling edge of plot 123 is shown by an arrow 126. This premature assertion of the SCSI SEL signal on SCSI bus segment 30 assures that any SCSI device on SCSI bus segment 30 which attempts to enter arbitration after the beginning of arbitration period 117 will terminate arbitration without gaining control of the bus. The SCSI SEL signal may be generated by, for example decoder unit 38, or by coder unit 17 and transmitted across long interconnection medium 41.

At the end of arbitration time period 117 each of the SCSI devices on SCSI bus segment 10 examines the IDs on data lines 11. The SCSI device on SCSI bus segment 10 with the highest asserted ID wins the arbitration. That SCSI device will assert the SEL signal, as represented by the falling edge of plot 113. An arrow 115 represents that the assertion of the SCSI SEL signal on control lines 12, represented by the falling edge of plot 113, causes the release of the SCSI BSY signal on control lines 12, represented by the rising edge of plot 112, after a period 118. An arrow 116 represents that the assertion of the SCSI SEL signal on SCSI bus segment 10, represented by the falling edge of plot 113, would have caused the assertion of the SCSI SEL signal on bus segment 30, except that the SCSI SEL signal on bus segment 30 was asserted prematurely to abort any arbitrations begun after the beginning of arbitration period 117. An arrow 128 represents that the release of the SCSI BSY signal on SCSI bus segment 10, represented by the rising edge of plot 112, causes the release, after the transmission delay, of the SCSI BSY signal on bus segment 30, represented by the rising edge of plot 122.

In the first embodiment of the present invention, both bus segment 10 and bus segment 30 operate symmetrically. The first SCSI bus segment in which the SCSI SEL signal is asserted will cause the other SCSI bus segment to abort any later occurring arbitration. In this embodiment, there is a collision condition in which the SCSI BSY signal is asserted on each bus at identical or closely proximate times. In this case, arbitration will be aborted on both bus segments and the SCSI devices will retry to gain access to the bus.

FIG. 5 represents timing diagrams for the case where the SCSI BSY signal is asserted on SCSI bus segment 10 at a time closely proximate to the assertion of the SCSI BSY signal on SCSI bus segment 30. In FIG. 5, a plot 132 represents timing for the SCSI BSY signal on control lines 12. A plot 133 represents timing for the SCSI SEL signal on control lines 12. A plot 142 represents timing for the SCSI BSY signal on control lines 32. A plot 143 represents timing for the SCSI SEL signal on control lines 32.

When a SCSI device on SCSI bus segment 10 asserts the SCSI BSY signal, as represented by the falling edge of plot 132, an arbitration period begins. The beginning of the arbitration time period is the "0" point on a time line 134. Shortly after the falling edge of plot 132, a SCSI device on SCSI bus segment 30 asserts the SCSI BSY signal, as represented by the falling edge of plot 142. The assertion of the SCSI BSY signal on SCSI bus 10 takes two microseconds to propagate through to SCSI bus segment 30, as represented by an arrow 131. Similarly, the assertion of the SCSI BSY signal on SCSI bus 30 takes two microseconds to propagate through to SCSI bus segment 10, as represented by an arrow 141.

Once extender 40 transmits the falling edge of the SCSI BSY signal from SCSI bus segment 10 to SCSI bus segment 30, extender 40 indicates back to SCSI bus segment 10, as represented by arrow 147, that the SCSI BSY signal on SCSI bus segment 30 has been released. The BSY signal on SCSI bus segment 10 is then released as represented by the rising edge of plot 132, followed closely by the release of the SEL signal on SCSI bus segment 10 as represented by the rising edge of plot 133. As represented by an arrow 146, extender 40 also asserts the SCSI SEL signal on bus segment 30, as shown by the falling edge of plot 143. This premature assertion of the SCSI SEL signal on SCSI bus segment 30 assures that the current arbitration on SCSI bus segment 30 is terminated. The SCSI devices on SCSI bus segment 30 will release the SCSI BSY signal 142 as represented by arrow 145; however, the SCSI SEL signal on SCSI bus segment 30 will remain asserted because of transmission delay of the SCSI SEL signal from SCSI bus segment 10. As shown, a glitch will generally result from the SCSI devices on SCSI bus segment 30 releasing the SCSI BSY signal 142 while SCSI extender 40 continues to hold the SCSI BSY signal 142 asserted.

Similarly, once extender 40 transmits the falling edge of the SCSI BSY signal from SCSI bus segment 30 to SCSI bus segment 10, extender 40 indicates back to SCSI bus segment 30, as represented by arrow 137, that the SCSI BSY signal on SCSI bus segment 10 has been released. The BSY signal on SCSI bus segment 30 is then released as represented by the rising edge of plot 142, followed closely by the release of the SEL signal on SCSI bus segment 30 as represented by the rising edge of plot 143. As represented by an arrow 136, extender 40 also asserts the SCSI SEL signal on bus segment 10, as shown by the falling edge of plot 133. This premature assertion of the SCSI SEL signal on SCSI bus segment 10 assures that the current arbitration on SCSI bus segment 10 is terminated. The SCSI devices on SCSI bus segment 10 will release the SCSI BSY signal as represented by arrow 135; however, the SCSI SEL signal on SCSI bus segment 10 will remain asserted because of transmission delay of the SCSI SEL signal from SCSI bus segment 30. As shown, a glitch will generally result from the SCSI devices on SCSI bus segment 10 releasing the SCSI BSY signal 132 while SCSI extender 40 continues to hold the SCSI BSY signal 132 asserted.

In the above-described first embodiment of the present invention it is not necessary for SCSI extender 40 to transfer ID values of the data lines between SCSI bus segment 10 and SCSI bus segment 30 during arbitration because ID transmitted through SCSI extender 40 will have no effect on which SCSI device will win arbitration.

There are circumstances where the first embodiment of the present invention will not be effective. For example, the above-described contention resolution scheme will not work when the transmission delay between two SCSI bus segments is greater than the arbitration period. Further, when arbitrations are simultaneously aborted on both SCSI bus segments, as illustrated by the timing diagrams in FIG. 5, the contention resolution depends on skew in retry times between SCSI devices on both SCSI segments to build up until premature abortion of arbitration occurs at only one of the SCSI bus segments. Additionally, the contention resolution depends upon the SCSI devices that abort arbitration upon seeing the SCSI SEL signal asserted.

A second preferred embodiment of the present invention overcomes the potential problems of the first embodiment by increasing the complexity of the SCSI extender. In the second embodiment, one SCSI bus segment is given priority over the other. During arbitration, once a SCSI device on the low-priority SCSI bus segment side requests control of the bus by asserting the SCSI BSY signal, the SCSI bus extender will assert the SCSI BSY SEL and ID7 signals. SCSI bus signal ID7 is the highest priority ID signal. The assertion of these SCSI signals will assure that no device on the low priority side will win arbitration. The SCSI bus extender then arbitrates for the bus on the high priority side. When the SCSI bus extender gains control of the SCSI bus on the high priority side, the SCSI bus extender allows arbitration on the low priority side to resume. The SCSI device on the low-priority side which wins arbitration is then granted control of the SCSI bus.

Figure 6:
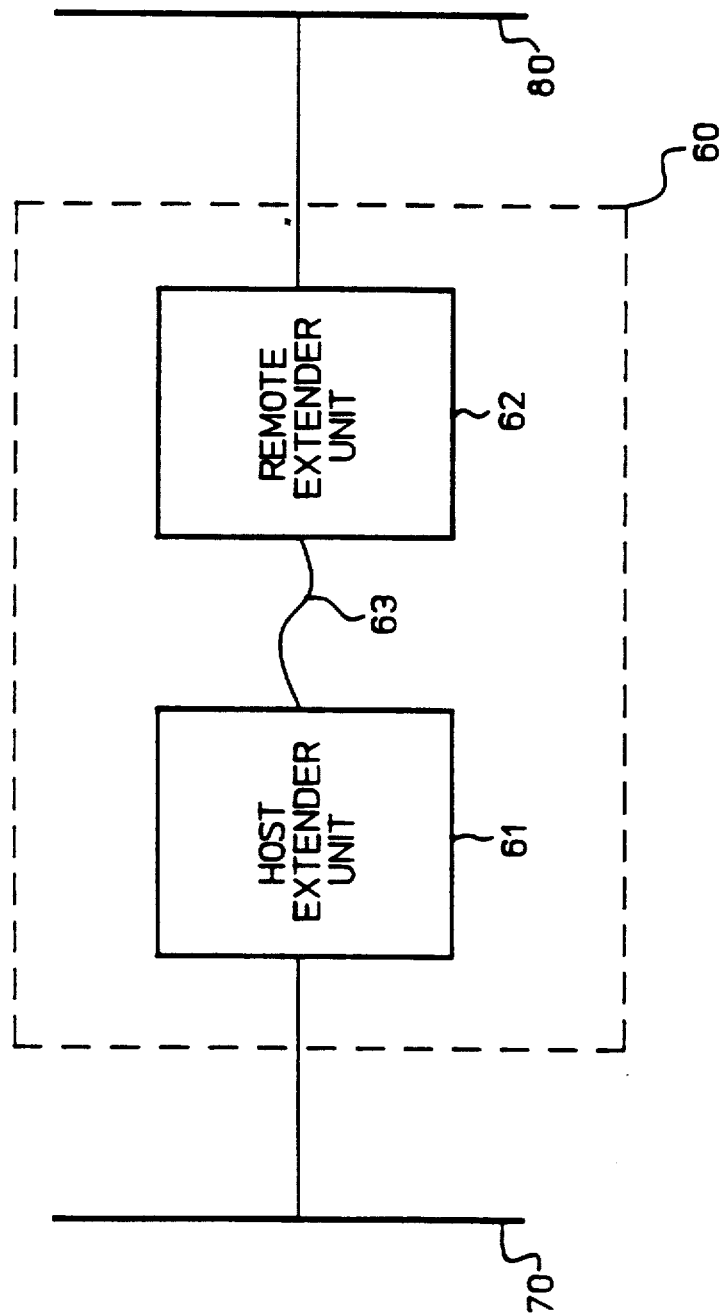
FIG. 6 shows a block diagram of a network architecture which provides for connection of two segments of a bus by a long interconnection medium in accordance with an alternate preferred embodiment of the present invention.

FIG. 6 shows a logical block diagram of the second preferred embodiment of the present invention. A SCSI extender 60 is connected between a SCSI bus segment 70 and SCSI bus segment 80. In this embodiment any SCSI device which is an initiator is connected to SCSI bus segment 70. SCSI devices which are targets may be connected to either SCSI bus segment 70 or SCSI bus segment 80.

SCSI extender 60 includes a host extender unit 61 and a remote extender unit 62. Host extender unit 61 and remote extender unit 62 are separated, for example, by an optical or coax cable 63 of approximately 100 meters. In order to implement the arbitration scheme host extender unit 61 and remote extender unit 62 each includes a state machine and the capacity to send and receive coded messages over optical or coax cable 63.

Figure 7:
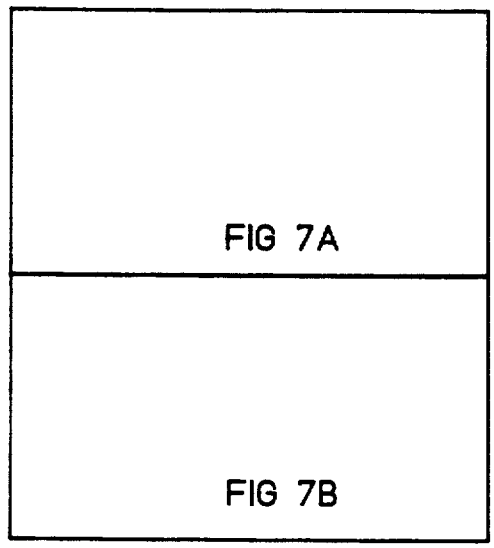
FIGS. 7, 7A, 7B and FIGS. 8, 8A, 8B show system protocol diagrams which illustrate arbitration for a SCSI network in which two bus segments are connected by a long interconnection medium in accordance with the alternate preferred embodiment of the present invention.
Figure 8:
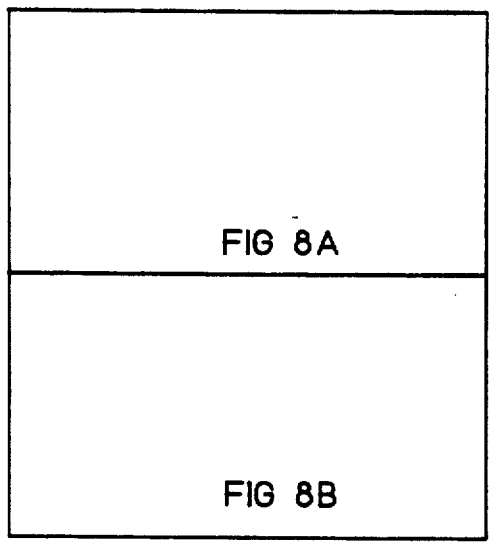
Figure 7A:
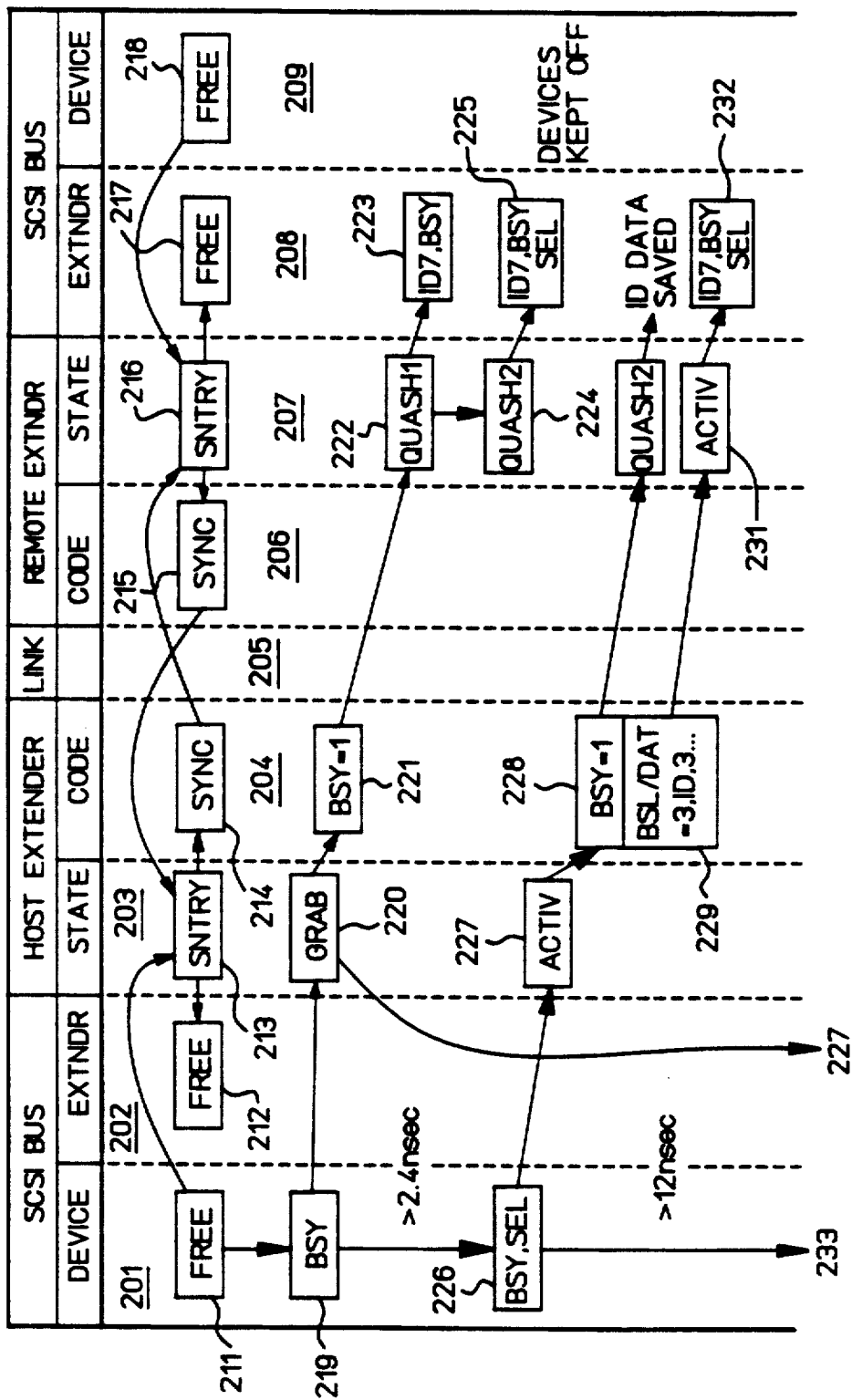
Figure 7B:
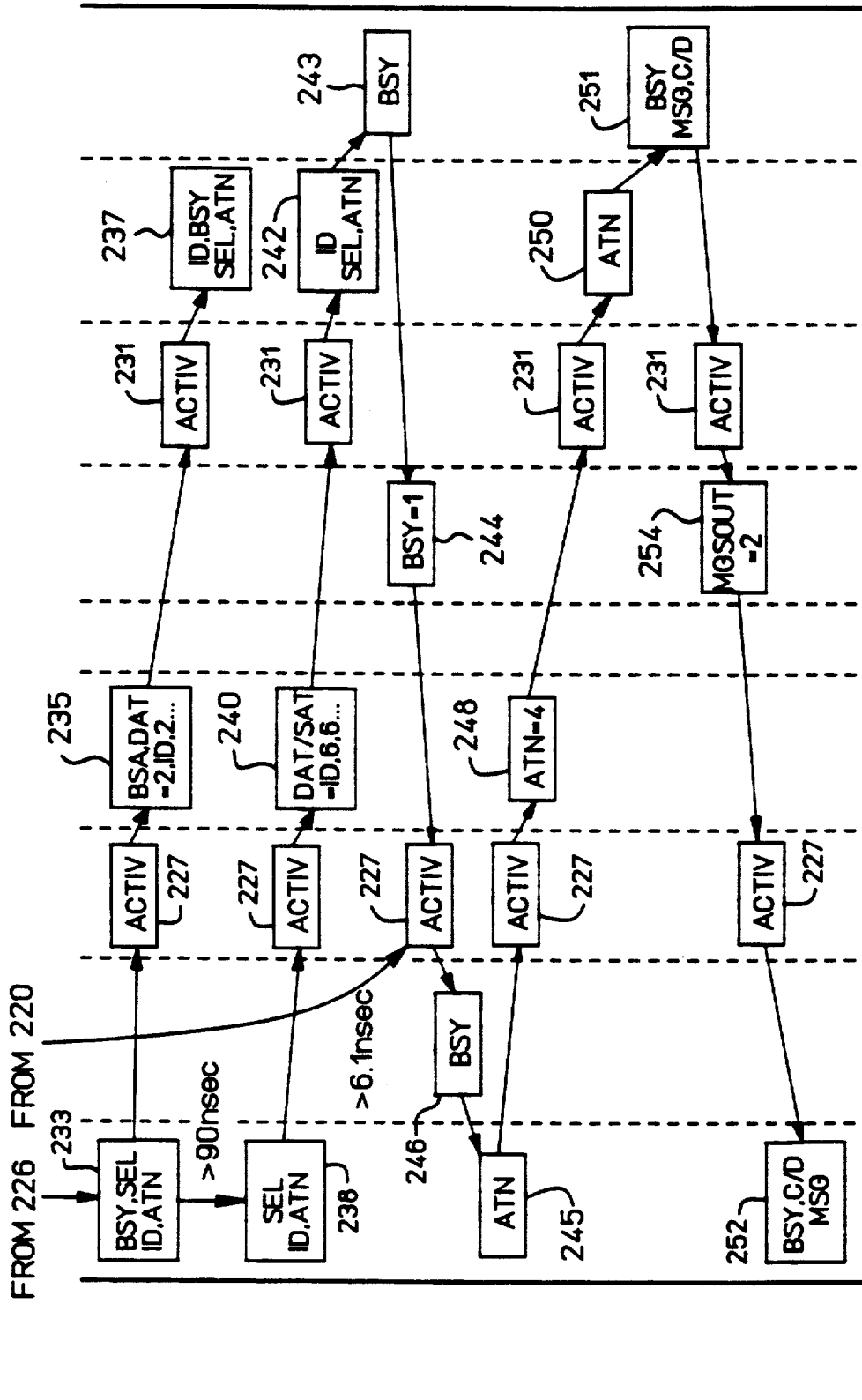
Figure 8A:
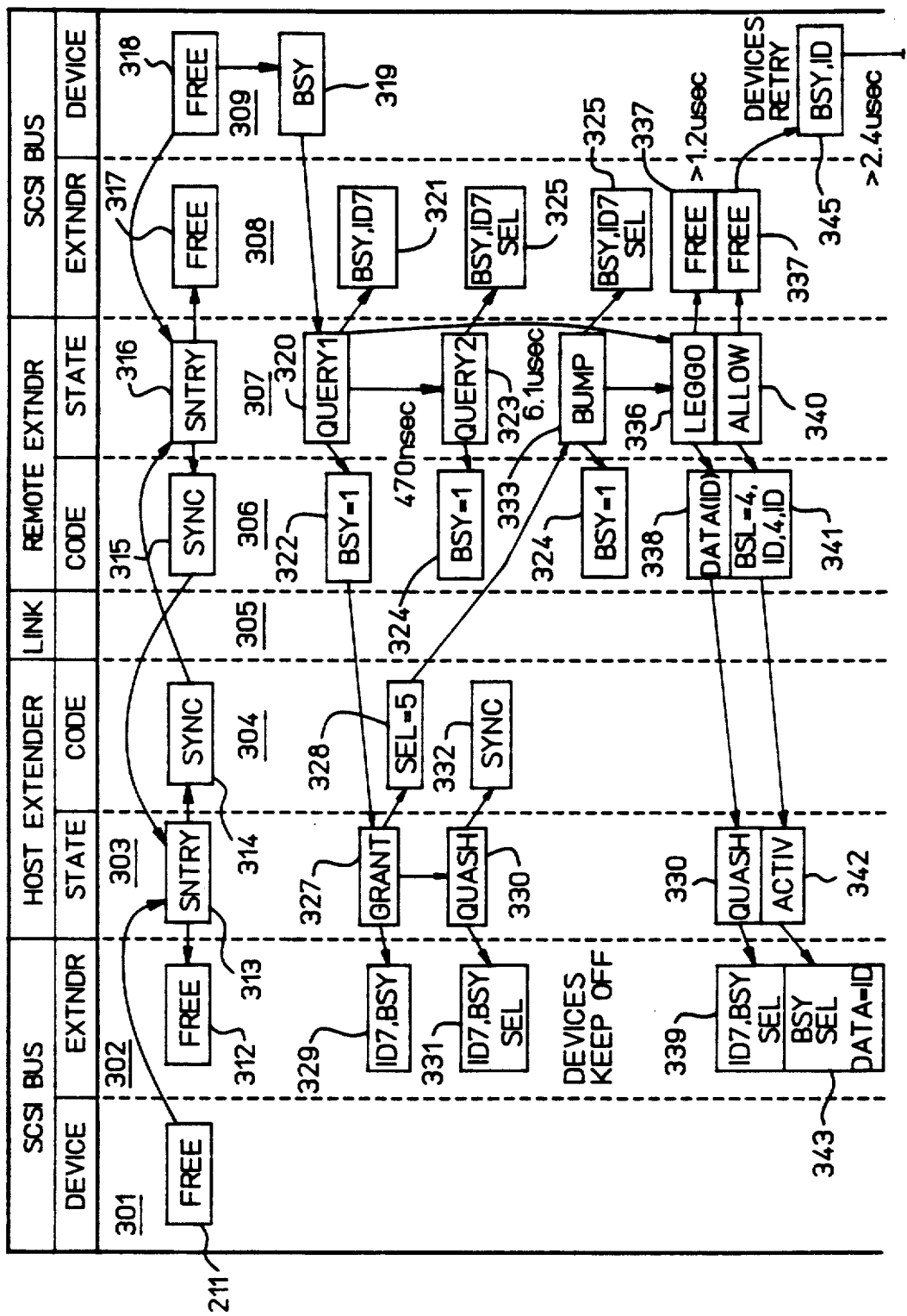
Figure 8B:
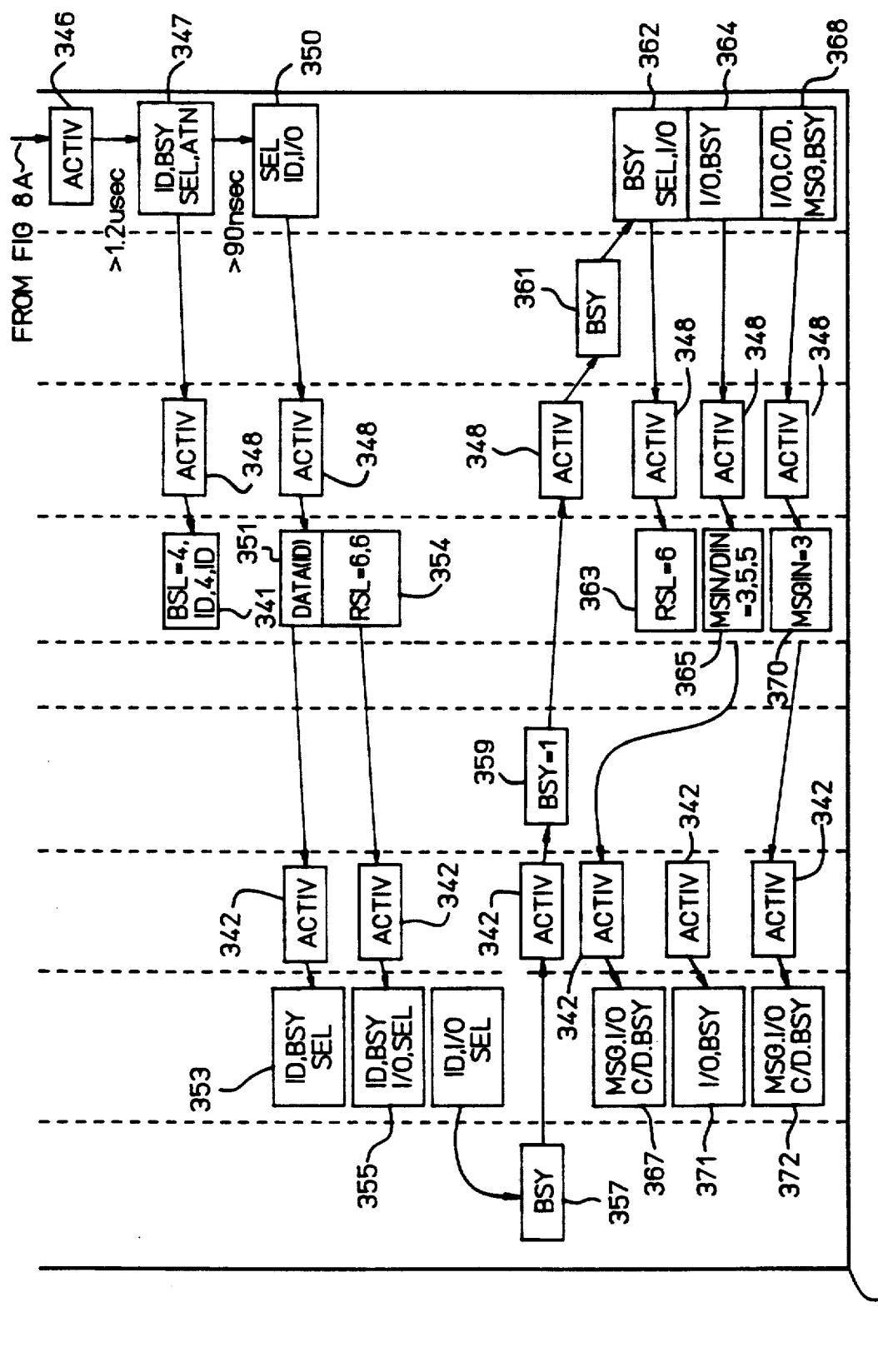

FIGS. 7 and 8 show system protocol diagrams which illustrate arbitration for a SCSI network in accordance with the preferred embodiment of the present invention. In the conventions governing the protocol diagrams, each box represents a signal set asserted by an extender, a particular state of an extender, or coded messages of a particular type sent between extenders. Once a signal set is asserted, that signal set remains asserted until a next signal set is asserted, as represented by a new box in the same column. Similarly, once an extender enters a particular state, the extender remains in that state until a new state is entered, as represented by a new box. Also, coded messages of a particular type are continually sent until coded messages of a new type are sent, as represented by a new box.

FIG. 7 shows a protocol diagram 200 for the case where an initiator on SCSI bus segment 70 gains control of the SCSI bus and selects a target on SCSI bus segment 80. A column 201 of protocol diagram 200 shows SCSI signal sets placed on SCSI bus segment 70 by the SCSI device functioning as the initiator for the data transaction. A column 202 of protocol diagram 200 shows SCSI signal sets placed on SCSI bus segment 70 by host extender unit 61. A column 203 shows the current state of host extender unit 61. A column 204 shows message codes sent from host extender unit 61 to remote extender unit 62. Column 205 represents the communication link through which host extender unit 61 communicates with remote extender unit 62, the communication link including, for example, optical cable 63. A column 209 of protocol diagram 200 shows SCSI signal sets placed on SCSI bus segment 80 by the SCSI device functioning as the target for the data transaction. A column 208 of protocol diagram 200 shows SCSI signal sets placed on SCSI bus segment 80 by remote extender unit 62. A column 207 shows the current state of remote extender unit 62. A column 206 shows message codes sent from remote extender unit 62 to host extender unit 61.

At the top of protocol diagram 200, the SCSI bus is in a bus free state. The SCSI devices on SCSI bus segment 70 allow a bus FREE condition 211 on SCSI bus segment 70. During bus FREE condition 211, no SCSI control signals are driven by the SCSI devices. Host extender unit 61 also allows a bus FREE condition 212 on SCSI bus segment 70, meaning host extender unit 61 does not drive any control signals on the SCSI bus. Host extender unit 61 is in a sentry state 213. Host extender unit 61 sends a synchronization message 214 across link 205 to remote extender unit 62. The SCSI devices on SCSI bus segment 80 place a bus FREE condition 218 on SCSI bus segment 80. Remote extender unit 62 allows a bus FREE condition 217 on SCSI bus segment 80. Remote extender unit 62 is in a sentry state 216. Remote extender unit 62 sends a synchronization message 215 across link 205 to host extender unit 61.

As discussed before, the initiating SCSI device (Initiator) begins arbitration by placing its ID on the SCSI data lines and asserting the BSY control signal set 219 on SCSI bus segment 70. Upon detecting the BSY signal set 219 on SCSI bus segment 70, host extender unit 61 will enter GRAB state 220. Host extender unit 61 will then forward a coded BSY message 226 across the link to remote extender unit 62. Upon receiving coded BSY message 226, remote extender unit 62 will enter a QUASH1 state 222. In QUASH1 state 222, remote extender unit 62 will begin the process of gaining control of SCSI bus segment 80, by asserting an ID7 and BSY signal set 223 on SCSI bus segment 80. Approximately 470 nanoseconds after entering QUASH1 state 222, remote extender unit 62 will enter a QUASH2 state 224. In QUASH2 state 222, remote extender unit 62 will complete the process of gaining control of SCSI bus segment 80, by additionally asserting SEL signal set 225. This keeps SCSI devices off SCSI bus segment 80.

After the 2.4 microsecond arbitration period which began with the assertion of BSY signal set 219, the Initiator which wins arbitration will additionally assert the SEL signal set 226. Upon detecting the SEL signal on SCSI bus segment 70, host extender unit 61 will enter ACTIV state 227. In ACTIV state 227, host extender unit 61 will pass the state of signals on SCSI bus segment 70 through to remote extender unit 62. Host extender unit 61 will send a message 228 with the ID of the Initiator that won arbitration. Host extender unit 61 will also send coded messages 229 which alternately sends data signals on the data lines of bus segment 70 and sends a code for the control signals for SCSI SEL and SCSI BSY. Upon receiving coded message 229, remote extender unit 62 will enter the active state 231. When both host extender unit 61 and remote extender unit 62 are in the active state, SCSI extender 60 serves to forward control and data signals between SCSI bus segment 70 and SCSI bus segment 80. After entering active state 231, remote extender 62 places the ID, BSY and SEL signal set 232 from SCSI bus segment 70 on through to SCSI bus segment 80.

At least 1.2 microseconds after the end of the arbitration period, the Initiator will assert the BSY, SEL, ID, and ATN signal set 233. The ID will be the ID of the target for the data transaction. Host extender unit 61 will pass these signals to remote extender unit 62 in the form of messages 235 which alternately sends data signals from the data lines of bus segment 70 and sends codes for the control signals of SCSI SEL, SCSI ATN and SCSI BSY. Remote extender unit 62 will then place ID, BSY, SEL and ATN signal set 237 on SCSI bus segment 80.

At least 90 nanoseconds after the assertion of signal set 233, the Initiator will assert only SEL, ID and ATN signal set 238, releasing the BSY signal. Host extender unit 61 will pass these signals to remote extender unit 62 in the form of messages 240 which first sends data signals (ID) from the data lines of bus segment 70 and and then continuously sends a code of the control signals for SCSI SEL, and SCSI ATN. Remote extender unit 62 will then place ID, SEL and ATN signal set 242 on SCSI bus segment 80. The SCSI device which is the target (Target) will place a BSY signal set 243 on SCSI bus segment 80. This is an acknowledgment of the selection. Remote extender unit 62 will forward this signal to host extender unit 61 by way of a message 244. Host extender unit 61 will place the BSY signal set 246 on SCSI bus segment 70. The Initiator will remove the SEL and ID signal and place the ATN signal set 245 on SCSI bus 245. Host extender unit 61 will forward this signal to remote extender unit 62 by way of a message 248. Remote extender unit 62 will release all control signals except ATN signal set 250 upon SCSI bus segment 80. The Target will then place BSY, MSG and C/D signal set 251 on SCSI bus segment 80. Remote extender unit 62 will forward these signals to host extender unit 61 by way of a message 254. Host extender unit 61 will place BSY, MSG and C/D signal set 252 on SCSI bus segment 70. The above described interaction has established the message out phase of the SCSI protocol. From here the information transfer continues in accordance with the SCSI protocol.

FIG. 8 shows a protocol diagram 300 for the case where a SCSI device on SCSI bus segment 80 gains control of the SCSI bus and reselects a SCSI device on SCSI bus segment 70.

A column 301 of protocol diagram 300 shows SCSI signals placed on SCSI bus segment 70 by the SCSI device functioning as the initiator for the data transaction. A column 302 of protocol diagram 300 shows SCSI signals placed on SCSI bus segment 70 by host extender unit 61. A column 303 shows the current state of host extender unit 61. A column 304 shows message codes sent from host extender unit 61 to remote extender unit 62. Column 305 represents the communication link through which host extender unit 61 communicates with remote extender unit 62, the communication link including, for example, optical cable 63. A column 309 of protocol diagram 300 shows SCSI signals placed on SCSI bus segment 80 by the SCSI device functioning as the target for the data transaction. A column 308 of protocol diagram 300 shows SCSI signals placed on SCSI bus segment 80 by remote extender unit 62. A column 307 shows the current state of remote extender unit 62. A column 306 shows message codes sent from remote extender unit 62 to host extender unit 61.

At the top of protocol diagram 300, the SCSI bus is in a bus free state. The SCSI devices on SCSI bus segment 70 allows a bus FREE condition 311 on SCSI bus segment 70. Host extender unit 61 also allows a bus FREE condition 312 on SCSI bus segment 70. Host extender unit 61 is in a sentry state 313. Host extender unit 61 sends a synchronization message 314 across link 305 to remote extender unit 62. The SCSI devices on SCSI bus segment 80 place a bus FREE condition 318 on SCSI bus segment 80. Remote extender unit 62 allows a bus FREE condition 317 on SCSI bus segment 80. Remote extender unit 62 is in a sentry state 316. Remote extender unit 62 sends a synchronization message 315 across link 305 to host extender unit 61.

When a SCSI device (Target) on SCSI bus segment 80 wishes to reselect a SCSI device (Initiator) on SCSI bus segment 70, the Target will assert the BSY signal set 319. Upon detecting BSY signal set 319, remote extender unit 62 will enter a QUERY1 state 320. In QUERY1 state 320, remote extender unit 62 will begin the process of gaining control of SCSI bus segment 80, by asserting an ID7 and BSY signal set 321 on SCSI bus segment 80. Approximately 470 nanoseconds after entering QUERY1 state 320, remote extender unit 62 will enter a QUERY2 state 323. In QUERY2 state 323, remote extender unit 62 will complete the process of gaining control of SCSI bus segment 80, by additionally asserting SEL signal set 325. This keeps SCSI devices off SCSI bus segment 80. Additionally, in QUERY2 state 323 a BSY message 324 is generated.

Also in QUERY1 state 320, remote extender unit 62 will send a BSY message 322 to host extender unit 61. Upon receipt of the BSY message 322, host extender unit 61 will enter a GRANT state 327. In GRANT state 327, host extender unit 61 will begin the process of gaining control of SCSI bus segment 70, by, if the SCSI bus is still free, asserting an ID7 and BSY signal set 321 on SCSI bus segment 70. Approximately 470 nanoseconds after entering GRANT state 327, host extender unit 61 will enter a QUASH state 330. In QUASH state 330, host extender unit 61 will complete the process of gaining control of SCSI bus segment 70, by additionally asserting SEL signal set 331. This keeps SCSI devices off SCSI bus segment 70. Also in QUASH state 330 a SYNC message 332 is generated.

In GRANT state 327, when host extender unit 61 detects that SCSI bus segment 70 is free, host extender unit 61 generates a SEL message 328. Upon receipt of the SEL message 328, remote extender unit 62 enters a BUMP state 333. In BUMP state 333, remote extender unit 62 continues to generate the BSY message signal set 324. Remote extender unit 62 continues to place the BSY, ID7 and SEL signal set 325 on SCSI bus segment 80. From BUMP state 333, remote extender unit 62 enters LEGGO state 336. This will occur after 6.1 microseconds has elapsed from entering QUERYI state 320. In LEGGO state 336, remote extender unit 62 allows a bus FREE 337 on SCSI bus segment 80. Remote extender unit 62 also generates a DATA(ID) message 338. Upon receiving the DATA(ID) message 338, host extender unit 61, still in QUASH state 330, places the ID7, BSY and SEL signal set 339 on SCSI bus segment 70.

From LEGGO state 336, remote extender unit 62 enters ALLOW state 340. In ALLOW state 340, remote extender unit 62 generates messages 341, which alternates sending the ID from the data lines of bus segment 80 with sending code signals indicating the SCSI BSY and SCSI SEL signals. Upon receiving message 341, host extender unit 61 enters an ACTIV state 342, where it will remain until it receives a SYNC message from the remote extender. In ACTIV state 342, host extender 61 places the BSY, SEL, and DATA ID signal set 343 on SCSI bus segment 70. Also in ALLOW state 340, remote extender unit 62 keeps bus FREE 337 on SCSI bus segment 80. After about 1.2 microseconds, any SCSI device on SCSI bus segment 80 that desires control of the SCSI bus will begin arbitration by placing the BSY and ID signal set 345 on SCSI bus segment 80. After the 2.4 microsecond arbitration period the SCSI device (Target) which wins arbitration will place BSY, ID and SEL signal set 346 on SCSI bus segment 80. After another at least 1.2 microseconds, the Target places the BSY, SEL, ID and I/0 signal set 347 on SCSI bus segment 80.

Upon remote extender unit 62 detecting signal set 347 on SCSI bus segment 80, remote extender unit 62 enters the ACTIV state 348 and continues to generate coded messages 349, which alternately sends an ID from the data lines of bus segment 80 and sends codes for the control signals of SCSI SEL and SCSI BSY. About 90 nanoseconds after placing signal set 347 on SCSI bus segment 80, the Target places SEL, ID, I/O signal set 350 on SCSI bus segment 80. Upon remote extender unit 62 detecting signal set 350 on SCSI bus segment 80, remote extender unit 62 generates a coded message 351, which sends an ID from the data lines of bus segment 80, followed by a coded message 354. As a result of receiving coded message 351 and coded message 354, host extender unit 61 successively places signal set 353, signal set 355 and signal set 356 on SCSI bus segment 70. Signal set 353 includes the ID, BSY and SEL signals. Signal set 355 includes the ID, BSY, I/O and SEL signals. Signal set 356 includes the ID, I/O and SEL signals.

In response to signal set 356, the SCSI device (initiator) on SCSI bus segment 70 whose ID is included in signal set 356 asserts BSY signal set 357 to acknowledge reselection by the target. Upon detecting BSY signal set 357, host extender unit 61 generates a coded message 359. Upon receiving coded message 359 remote extender unit 62 places a BSY signal set 361 on SCSI bus segment 80. In response to BSY signal set 361, the Target device successively places signal sets 362, signal sets 364 and signal sets 368 on SCSI bus segment 80. There is an indefinite time interval between these signal sets. Signal set 362 includes the SCSI BSY, SEL and I/O signals. Signal set 364 includes the SCSI I/O and BSY signals. Signal set 368 includes the SCSI I/O, C/D, MSG and BSY signals. In response to signal set 362, signal set 364 and signal set 368, remote extender unit 62 generates a coded message 363, alternating coded messages 365 and a coded message 370. As a result of receiving coded message 363, coded message 365 and coded message 370, host extender unit 61 successively places signal set 367, signal set 371 and signal set 372 on SCSI bus segment 70. Signal set 367 includes the MSG, I/O, C/D and BSY signals. Signal set 371 includes the I/O and BSY signals. Signal set 372 includes the MSG, I/O, C/D and BSY signals. From here the data transfer continues in accordance with the SCSI protocol.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

We claim:

1. In a computing system having a network in which a first network segment is connected to a second network segment by a long interconnection medium over an extended distance, a method for performing arbitration between network devices connected to one of the first network segment and the second network segment, the method comprising the steps of:
   (a) asserting, when at least one network device connected to the first network segment senses the network is free and desires control of the network for a data transfer, by the at least one network device, a first network control signal, an arbitration period for the first network segment beginning upon a first assertion of the first network control signal by one of the at least one network devices connected to the first network segment;
   (b) forwarding by the network over the long connection medium, the first network control signal to the second network segment;
   (c) aborting by the network, upon the second network segment receiving the first network control signal, any arbitration currently in progress upon the second network segment without granting control on any network device connected to the second network segment; and,
   (d) granting by the network, upon completion of the arbitration period for the first network device, when arbitration upon the first network segment is not aborted, control to one of the at least one network devices connected to the first network segment.

2. A method as in claim 1 additionally comprising the steps of:
   (e) asserting, when at least one network device connected to the second network segment senses the network is free and desires control of the network for a data transfer, by the at least one network device connected to the second network segment, the first network control signal, an arbitration period for the second network segment beginning upon a first assertion of the first network control signal by one of the at least one network devices connected to the second network segment;
   (f) forwarding, by the network over the long connection medium, the first network control signal to the first network segment; and,
   (g) aborting by the network, upon the first network segment receiving the first network control signal, any arbitration currently in progress upon the first network segment without granting control on any network device connected to the first network segment; and,
   (h) granting by the network, upon completion of the arbitration period for the second network device, when arbitration upon the second network segment is not aborted, control to one of the at least one network devices connected to the second network segment.

3. A method as in claim 2 wherein step (c) includes the following substep:
   (c.1) asserting, by the network, on the second network segment a second network control signal which indicates a network device has won arbitration.

4. A method as in claim 3 wherein step (c) additionally includes the following substep:
   (c.2) asserting, by the network, on the second network segment a highest priority network device identification.

5. A method as in claim 1 wherein step (c) includes the following substep:
   (c.1) asserting, by the network, on the second network segment a second network control signal which indicates a network device has won arbitration.

6. A method as in claim 5 wherein step (c) additionally includes the following substep:
   (c.2) asserting by the network, before step (c.1), on the second network segment a highest priority network device identification.

7. A method as in claim 1 additionally comprising the steps of:
   (e) asserting, when at least one network device connected to the second network segment senses the network is free and desires control of the network for a data transfer, by the at least one network device connected to the second network segment, the first network control signal;
   (f) performing by the network, when the first network control signal is asserted on the second network segment and control of the first network segment has not been obtained in order to allow a network device connected to the second network to gain control of the network, the following substeps:
- (f.1) aborting arbitration on the second network segment, and
- (f.2) obtaining control of the first network segment in order to allow a network device connected to the second network to gain control of the network; and,
- (g) performing by the network, when the first network control signal is asserted on the second network segment and control of the first network segment has been obtained in order to allow a network device connected to the second network to gain control of the network, the following substep:
  - (g.1) arbitrating between network devices on the second network segment in order to grant a device on the second network segment control of the network.

8. A method as in claim 7 wherein step (f.1) includes the following substep:
asserting on the second network segment a second network control signal which indicates a network device has won arbitration.

9. A method as in claim 8 wherein step (f.1) additionally includes the following substep:
asserting on the second network segment a highest priority network device identification.

10. A method as in claim 7 wherein step (f.2) includes the following substeps:
asserting on the first network segment a highest priority network device identification; and,
asserting on the first network segment a second network control signal which indicates a network device has won arbitration.

11. A method as in claim 7 wherein step (f.2) includes:
signalling the second network segment when control of the first network device segment has been obtained.

12. In a computing system having a network in which a first network segment is connected to a second network segment by a long interconnection medium over an extended distance, a method for performing arbitration between network devices connected to one of the first network segment and the second network segment, the method comprising the steps of:
- (a) asserting, when at least one network device connected to the first network segment senses the network is free and desires control of the network for a data transfer, by the at least one network device, a first network control signal, an arbitration period for the first network segment beginning upon a first assertion of the first network control signal by one of the at least one network devices connected to the first network segment;
- (b) forwarding, by the network, the first network control signal to the second network segment;
- (c) aborting by the network, upon the second network segment receiving the first network control signal, any arbitration currently in progress upon the second network segment without granting control on any network device connected to the second network segment;
- (d) granting by the network, upon completion of the arbitration period for the first network device, control to one of the at least one network devices connected to the first network segment.
- (e) asserting, when at least one network device connected to the second network segment senses the network is free and desires control of the network for a data transfer, by the at least one network device connected to the second network segment, the first network control signal, an arbitration period for the second network segment beginning upon a first assertion of the first network control signal by one of the at least one network devices connected to the second network segment;
- (f) performing by the network, when the first network control signal is asserted on the second network segment and control of the first network segment has not been obtained in order to allow a network device connected to the second network to gain control of the network, the following substeps:
  - (f.1) aborting arbitration on the second network segment, and
  - (f.2) obtaining control of the first network segment in order to allow a network device connected to the second network to gain control of the network; and,
- (g) performing by the network, when the first network control signal is asserted on the second network segment and control of the first network segment has been obtained in order to allow a network device connected to the second network to gain control of the network, the following substep:
  - (g.1) granting, upon completion of the arbitration period for the first network device, control to one of the at least one network devices connected to the first network segment.

13. A method as in claim 12 wherein step (f.1) includes the following substep:
asserting on the second network segment a second network control signal which indicates a network device has won arbitration.

14. A method as in claim 13 wherein step (f.1) additionally includes the following substep:
asserting on the second network segment a highest priority network device identification.

15. A method as in claim 12 wherein step (f.2) includes the following substeps:
asserting on the first network segment a highest priority network device identification; and,
asserting on the first network segment a second network control signal which indicates a network device has won arbitration.

16. A method as in claim 12 wherein step (f.2) includes:
signalling the second network segment when control of the first network device segment has been obtained.

* * * * *